(12) United States Patent
Popovich et al.

(10) Patent No.: US 11,106,048 B2
(45) Date of Patent: Aug. 31, 2021

(54) WAVEGUIDE LASER ILLUMINATOR INCORPORATING A DESPECKLER

(71) Applicant: DigiLens Inc., Sunnyvale, CA (US)

(72) Inventors: Milan Momcilo Popovich, Leicester (GB); Jonathan David Waldern, Los Altos Hills, CA (US); Alastair John Grant, San Jose, CA (US)

(73) Assignee: Digilens Inc., Sunnyvale, CA (US)

( * ) Notice: Subject to any disclaimer, the term of this patent is extended or adjusted under 35 U.S.C. 154(b) by 0 days.

(21) Appl. No.: 16/888,360

(22) Filed: May 29, 2020

(65) Prior Publication Data
US 2020/0292840 A1 Sep. 17, 2020

Related U.S. Application Data

(63) Continuation of application No. 15/502,583, filed as application No. PCT/GB2015/000225 on Aug. 4, 2015, now Pat. No. 10,670,876.

(60) Provisional application No. 61/999,866, filed on Aug. 8, 2014.

(51) Int. Cl.
*G02B 27/48* (2006.01)
*G02B 5/32* (2006.01)
*F21V 8/00* (2006.01)
*G02B 27/42* (2006.01)
(Continued)

(52) U.S. Cl.
CPC .............. *G02B 27/48* (2013.01); *G02B 5/32* (2013.01); *G02B 6/0016* (2013.01); *G02B 6/0038* (2013.01); *G02B 6/0055* (2013.01); *G02B 6/0083* (2013.01); *G02B 27/4261* (2013.01); *G02F 1/292* (2013.01); *G02F 1/3136* (2013.01)

(58) Field of Classification Search
None
See application file for complete search history.

(56) References Cited

U.S. PATENT DOCUMENTS

| 4,133,152 A | 1/1979 | Penrose |
| 5,016,953 A | 5/1991 | Moss et al. |
| 5,076,664 A | 12/1991 | Migozzi |

(Continued)

FOREIGN PATENT DOCUMENTS

| CN | 101151562 A | 3/2008 |
| CN | 101263412 A | 9/2008 |

(Continued)

OTHER PUBLICATIONS

International Preliminary Report on Patentability for International Application No. PCT/GB2013/000273, dated Dec. 23, 2014, dated Dec. 31, 2014, 8 pgs.

(Continued)

*Primary Examiner* — Chad H Smith
(74) *Attorney, Agent, or Firm* — KPPB LLP

(57) ABSTRACT

There is provided an illumination device comprising: a laser; a waveguide comprising at least first and second transparent lamina; a first grating device for coupling light from the laser into a TIR path in the waveguide; a second grating device for coupling light from the TIR path out of the waveguide; and a third grating device for applying a variation of at least one of beam deflection, phase retardation or polarization rotation across the wavefronts of the TIR light. The first second and third grating devices are each sandwiched by transparent lamina.

18 Claims, 12 Drawing Sheets

(51) Int. Cl.
*G02F 1/29* (2006.01)
*G02F 1/313* (2006.01)

(56) References Cited

U.S. PATENT DOCUMENTS

| | | |
|---|---|---|
| 5,150,234 A | 9/1992 | Takahashi et al. |
| 5,493,448 A | 2/1996 | Betensky et al. |
| 5,604,611 A | 2/1997 | Saburi et al. |
| 5,724,463 A | 3/1998 | Deacon et al. |
| 5,790,314 A | 8/1998 | Duck et al. |
| 5,847,787 A | 12/1998 | Fredley et al. |
| 5,857,043 A | 1/1999 | Cook et al. |
| 5,903,396 A | 5/1999 | Rallison |
| 5,962,147 A | 10/1999 | Shalhub et al. |
| 6,046,585 A | 4/2000 | Simmonds |
| 6,107,943 A | 8/2000 | Schroeder |
| 6,118,908 A | 9/2000 | Bischel et al. |
| 6,121,899 A | 9/2000 | Theriault |
| 6,167,169 A | 12/2000 | Brinkman et al. |
| 6,185,016 B1 | 2/2001 | Popovich |
| 6,222,297 B1 | 4/2001 | Perdue |
| 6,323,970 B1 | 11/2001 | Popovich |
| 6,323,989 B1 | 11/2001 | Jacobson et al. |
| 6,356,674 B1 | 3/2002 | Davis et al. |
| 6,366,369 B2 | 4/2002 | Ichikawa et al. |
| 6,407,724 B2 | 6/2002 | Waldern et al. |
| 6,449,095 B1 | 9/2002 | Ohtaki et al. |
| 6,473,209 B1 | 10/2002 | Popovich |
| 6,522,794 B1 | 2/2003 | Bischel et al. |
| 6,534,977 B1 | 3/2003 | Duncan et al. |
| 6,552,789 B1 | 4/2003 | Modro |
| 6,567,014 B1 | 5/2003 | Hansen et al. |
| 6,919,003 B2 | 7/2005 | Ikeda et al. |
| 6,943,788 B2 | 9/2005 | Tomono |
| 6,972,788 B1 | 12/2005 | Robertson et al. |
| 7,006,732 B2 | 2/2006 | Gunn, III et al. |
| 7,046,439 B2 | 5/2006 | Kaminsky et al. |
| 7,068,898 B2 | 6/2006 | Buretea et al. |
| 7,212,175 B1 | 5/2007 | Magee et al. |
| 7,369,911 B1 | 5/2008 | Volant et al. |
| 7,447,967 B2 | 11/2008 | Onggosanusi et al. |
| 7,500,104 B2 | 3/2009 | Goland |
| 7,513,668 B1 | 4/2009 | Peng et al. |
| 7,525,448 B1 | 4/2009 | Wilson et al. |
| 7,605,719 B1 | 10/2009 | Wenger et al. |
| 7,605,774 B1 | 10/2009 | Brandt et al. |
| 7,617,022 B1 | 11/2009 | Wood et al. |
| 7,619,825 B1 | 11/2009 | Peng et al. |
| 7,691,248 B2 | 4/2010 | Ikeda et al. |
| 7,733,571 B1 | 6/2010 | Li |
| 7,928,862 B1 | 4/2011 | Matthews |
| 7,961,117 B1 | 6/2011 | Zimmerman et al. |
| 8,073,296 B2 | 12/2011 | Mukawa et al. |
| 8,120,548 B1 | 2/2012 | Barber |
| 8,264,498 B1 | 9/2012 | Vanderkamp et al. |
| 8,384,730 B1 | 2/2013 | Vanderkamp et al. |
| 8,493,662 B2 | 7/2013 | Noui |
| 8,742,952 B1 | 6/2014 | Bold |
| 8,816,578 B1 | 8/2014 | Peng et al. |
| 8,830,143 B1 | 9/2014 | Pitchford et al. |
| 8,933,144 B2 | 1/2015 | Enomoto et al. |
| 9,176,324 B1 | 11/2015 | Scherer et al. |
| 9,244,275 B1 | 1/2016 | Li |
| 9,244,281 B1 | 1/2016 | Zimmerman et al. |
| 9,274,349 B2 | 3/2016 | Popovich et al. |
| 9,377,852 B1 | 6/2016 | Shapiro et al. |
| 9,464,779 B2 | 10/2016 | Popovich et al. |
| 9,507,150 B1 | 11/2016 | Stratton et al. |
| 9,519,089 B1 | 12/2016 | Brown et al. |
| 9,541,763 B1 | 1/2017 | Heberlein et al. |
| 9,551,468 B2 | 1/2017 | Jones |
| 9,599,813 B1 | 3/2017 | Stratton et al. |
| 9,635,352 B1 | 4/2017 | Henry et al. |
| 9,648,313 B1 | 5/2017 | Henry et al. |
| 9,674,413 B1 | 6/2017 | Tiana et al. |
| 9,678,345 B1 | 6/2017 | Melzer et al. |
| 9,679,367 B1 | 6/2017 | Wald |
| 9,715,110 B1 | 7/2017 | Brown et al. |
| 9,733,475 B1 | 8/2017 | Brown et al. |
| 9,754,507 B1 | 9/2017 | Wenger et al. |
| 9,762,895 B1 | 9/2017 | Henry et al. |
| 9,766,465 B1 | 9/2017 | Tiana et al. |
| 9,785,231 B1 | 10/2017 | Zimmerman |
| 9,791,694 B1 | 10/2017 | Haverkamp et al. |
| 9,791,696 B2 | 10/2017 | Woltman et al. |
| 9,804,389 B2 | 10/2017 | Popovich et al. |
| 9,874,931 B1 | 1/2018 | Koenck et al. |
| 9,977,247 B1 | 5/2018 | Brown et al. |
| 10,089,516 B2 | 10/2018 | Popovich et al. |
| 10,209,517 B2 | 2/2019 | Popovich et al. |
| 10,216,061 B2 | 2/2019 | Popovich et al. |
| 10,234,696 B2 | 3/2019 | Popovich et al. |
| 10,241,330 B2 | 3/2019 | Popovich et al. |
| 10,330,777 B2 | 6/2019 | Popovich et al. |
| 10,359,736 B2 | 7/2019 | Popovich et al. |
| 10,423,813 B2 | 9/2019 | Popovich et al. |
| 10,444,510 B1 | 10/2019 | Lee et al. |
| 10,527,797 B2 | 1/2020 | Waldern et al. |
| 10,545,346 B2 | 1/2020 | Waldern et al. |
| 10,670,876 B2 | 6/2020 | Popovich et al. |
| 10,725,312 B2 | 7/2020 | Popovich et al. |
| 10,942,430 B2 | 3/2021 | Waldern et al. |
| 2001/0024177 A1 | 9/2001 | Popovich |
| 2002/0093701 A1 | 7/2002 | Zhang et al. |
| 2002/0127497 A1 | 9/2002 | Brown et al. |
| 2003/0025881 A1* | 2/2003 | Hwang ............ G02F 1/133621 353/31 |
| 2003/0063884 A1 | 4/2003 | Smith et al. |
| 2003/0175004 A1 | 9/2003 | Garito et al. |
| 2003/0197154 A1 | 10/2003 | Manabe et al. |
| 2004/0012833 A1 | 1/2004 | Newswanger et al. |
| 2004/0156008 A1 | 8/2004 | Reznikov et al. |
| 2004/0225025 A1 | 11/2004 | Sullivan et al. |
| 2004/0263969 A1 | 12/2004 | Lipton et al. |
| 2005/0174321 A1 | 8/2005 | Ikeda et al. |
| 2005/0218377 A1 | 10/2005 | Lawandy |
| 2005/0231774 A1 | 10/2005 | Hayashi et al. |
| 2005/0259217 A1 | 11/2005 | Lin et al. |
| 2005/0259944 A1 | 11/2005 | Anderson et al. |
| 2006/0002274 A1 | 1/2006 | Kihara et al. |
| 2006/0055993 A1 | 3/2006 | Kobayashi et al. |
| 2006/0142455 A1 | 6/2006 | Agarwal et al. |
| 2007/0109400 A1 | 5/2007 | Woodgate et al. |
| 2007/0127348 A1 | 6/2007 | Ooi et al. |
| 2007/0146624 A1 | 6/2007 | Duston et al. |
| 2007/0195409 A1 | 8/2007 | Yun et al. |
| 2008/0089073 A1 | 4/2008 | Hikmet |
| 2008/0225187 A1 | 9/2008 | Yamanaka |
| 2008/0297807 A1 | 12/2008 | Feldman et al. |
| 2009/0052017 A1 | 2/2009 | Sasaki |
| 2009/0128781 A1* | 5/2009 | Li ....................... G02B 27/0994 353/20 |
| 2009/0136246 A1 | 5/2009 | Murakami |
| 2009/0169152 A1 | 7/2009 | Oestergard |
| 2010/0065726 A1 | 3/2010 | Zhong et al. |
| 2010/0079841 A1* | 4/2010 | Levola ................ G02B 6/0038 359/240 |
| 2010/0135615 A1 | 6/2010 | Ho et al. |
| 2010/0165660 A1 | 7/2010 | Weber et al. |
| 2010/0225834 A1 | 9/2010 | Li |
| 2010/0322555 A1 | 12/2010 | Vermeulen et al. |
| 2011/0102711 A1 | 5/2011 | Sutherland et al. |
| 2011/0299075 A1 | 12/2011 | Meade et al. |
| 2012/0218481 A1* | 8/2012 | Popovich ............ G02B 5/1842 349/11 |
| 2012/0326950 A1 | 12/2012 | Park et al. |
| 2013/0016362 A1 | 1/2013 | Gong et al. |
| 2013/0027006 A1 | 1/2013 | Holloway et al. |
| 2013/0088637 A1 | 4/2013 | Duparre |
| 2013/0107186 A1 | 5/2013 | Ando et al. |
| 2013/0300997 A1 | 11/2013 | Popovich et al. |
| 2013/0314789 A1 | 11/2013 | Saarikko et al. |
| 2014/0002514 A1* | 1/2014 | Richards ............ G02B 27/1026 345/691 |

(56) References Cited

U.S. PATENT DOCUMENTS

| | | |
|---|---|---|
| 2014/0009809 A1 | 1/2014 | Pyun et al. |
| 2014/0043672 A1 | 2/2014 | Clarke et al. |
| 2014/0104685 A1 | 4/2014 | Bohn et al. |
| 2014/0126175 A1* | 5/2014 | Amitai ............... G02B 5/32 362/19 |
| 2014/0268353 A1 | 9/2014 | Fujimura et al. |
| 2015/0086163 A1 | 3/2015 | Valera et al. |
| 2015/0086907 A1 | 3/2015 | Mizuta et al. |
| 2015/0109763 A1 | 4/2015 | Shinkai et al. |
| 2015/0177686 A1 | 6/2015 | Lee et al. |
| 2015/0219834 A1 | 8/2015 | Nichol et al. |
| 2015/0309264 A1 | 10/2015 | Abovitz et al. |
| 2016/0178901 A1 | 6/2016 | Ishikawa |
| 2016/0283773 A1 | 9/2016 | Popovich et al. |
| 2016/0291328 A1 | 10/2016 | Popovich et al. |
| 2016/0336033 A1 | 11/2016 | Tanaka |
| 2017/0010466 A1 | 1/2017 | Klug et al. |
| 2017/0032166 A1 | 2/2017 | Raguin et al. |
| 2017/0059775 A1 | 3/2017 | Coles et al. |
| 2017/0131545 A1 | 5/2017 | Wall et al. |
| 2017/0160546 A1 | 6/2017 | Bull et al. |
| 2017/0212295 A1 | 7/2017 | Vasylyev |
| 2017/0219841 A1 | 8/2017 | Popovich et al. |
| 2017/0255257 A1 | 9/2017 | Tiana et al. |
| 2017/0322426 A1 | 11/2017 | Tervo |
| 2017/0357841 A1 | 12/2017 | Popovich et al. |
| 2018/0052277 A1 | 2/2018 | Schowengerdt et al. |
| 2018/0074352 A1 | 3/2018 | Popovich et al. |
| 2018/0172995 A1 | 6/2018 | Lee et al. |
| 2018/0188542 A1 | 7/2018 | Waldern et al. |
| 2018/0210198 A1 | 7/2018 | Brown et al. |
| 2018/0210396 A1 | 7/2018 | Popovich et al. |
| 2018/0232048 A1 | 8/2018 | Popovich et al. |
| 2018/0252869 A1 | 9/2018 | Ayres et al. |
| 2018/0373115 A1 | 12/2018 | Brown et al. |
| 2019/0042827 A1 | 2/2019 | Popovich et al. |
| 2019/0064735 A1 | 2/2019 | Waldern et al. |
| 2019/0113751 A9 | 4/2019 | Waldern et al. |
| 2019/0121027 A1 | 4/2019 | Popovich et al. |
| 2019/0187538 A1 | 6/2019 | Popovich et al. |
| 2019/0212588 A1 | 7/2019 | Waldern et al. |
| 2019/0212589 A1 | 7/2019 | Waldern et al. |
| 2019/0212596 A1 | 7/2019 | Waldern et al. |
| 2019/0212597 A1 | 7/2019 | Waldern et al. |
| 2019/0212698 A1 | 7/2019 | Waldern et al. |
| 2019/0212699 A1 | 7/2019 | Waldern et al. |
| 2019/0219822 A1 | 7/2019 | Popovich et al. |
| 2020/0026074 A1 | 1/2020 | Waldern et al. |
| 2020/0033190 A1 | 1/2020 | Popovich et al. |
| 2020/0057353 A1 | 2/2020 | Popovich et al. |
| 2020/0159023 A1 | 5/2020 | Bhargava et al. |
| 2020/0264378 A1 | 8/2020 | Grant et al. |
| 2020/0341194 A1 | 10/2020 | Waldern et al. |
| 2020/0348531 A1 | 11/2020 | Popovich et al. |

FOREIGN PATENT DOCUMENTS

| | | |
|---|---|---|
| CN | 101589326 A | 11/2009 |
| CN | 101688977 A | 3/2010 |
| CN | 101793555 A | 8/2010 |
| CN | 102314092 A | 1/2012 |
| CN | 103562802 A | 2/2014 |
| CN | 103777282 A | 5/2014 |
| CN | 103823267 A | 5/2014 |
| CN | 104040410 A | 9/2014 |
| CN | 106125308 A | 11/2016 |
| CN | 106716223 A | 5/2017 |
| CN | 108474945 A | 8/2018 |
| CN | 108780224 A | 11/2018 |
| CN | 109154717 A | 1/2019 |
| CN | 103823267 B | 5/2019 |
| CN | 110383117 A | 10/2019 |
| CN | 111025657 A | 4/2020 |
| CN | 111386495 A | 7/2020 |
| DE | 102013209436 A1 | 11/2014 |
| EP | 0822441 A2 | 2/1998 |
| EP | 1938152 A1 | 7/2008 |
| EP | 3359999 A1 | 8/2018 |
| EP | 2494388 B1 | 11/2018 |
| EP | 3433658 A1 | 1/2019 |
| EP | 3433659 A1 | 1/2019 |
| EP | 2842003 B1 | 2/2019 |
| EP | 3548939 A2 | 10/2019 |
| EP | 3698214 | 8/2020 |
| FI | 20176157 A1 | 6/2019 |
| FI | 20176161 A1 | 6/2019 |
| JP | 2000511306 A | 8/2000 |
| JP | 2000261706 A | 9/2000 |
| JP | 2002311379 A | 10/2002 |
| JP | 2007094175 A | 4/2007 |
| JP | 2009133999 A | 6/2009 |
| JP | 2013235256 A | 11/2013 |
| JP | 2014132328 A | 7/2014 |
| JP | 2015523586 A | 8/2015 |
| JP | 2015172713 A | 10/2015 |
| JP | 2016030503 A | 3/2016 |
| JP | 2018508037 A | 3/2018 |
| JP | 2018533069 A | 11/2018 |
| JP | 2019512745 A | 5/2019 |
| JP | 2019520595 A | 7/2019 |
| JP | 6598269 B2 | 10/2019 |
| JP | 2020-537187 A | 12/2020 |
| KR | 20060132474 A | 12/2006 |
| WO | 2004102226 A2 | 11/2004 |
| WO | 2008081070 A1 | 7/2008 |
| WO | 2011042711 A3 | 6/2011 |
| WO | 2013027004 A1 | 2/2013 |
| WO | 2013190257 A1 | 12/2013 |
| WO | 2015015138 A1 | 2/2015 |
| WO | 2016042283 A1 | 3/2016 |
| WO | 2016044193 A1 | 3/2016 |
| WO | 2016116733 A1 | 7/2016 |
| WO | 2016130509 A1 | 8/2016 |
| WO | 2016156776 A1 | 10/2016 |
| WO | 2016181108 A1 | 11/2016 |
| WO | 2017094129 A1 | 6/2017 |
| WO | 2017120320 A1 | 7/2017 |
| WO | 2017134412 A1 | 8/2017 |
| WO | 2017162999 A8 | 9/2017 |
| WO | 2017178781 A1 | 10/2017 |
| WO | 2017182771 A1 | 10/2017 |
| WO | 2017203200 A1 | 11/2017 |
| WO | 2017203201 A1 | 11/2017 |
| WO | 2017207987 A1 | 12/2017 |
| WO | 2018102834 A2 | 6/2018 |
| WO | 2018102834 A3 | 6/2018 |
| WO | 2018096359 A3 | 7/2018 |
| WO | 2018129398 A1 | 7/2018 |
| WO | 2018150163 A1 | 8/2018 |
| WO | 2018206487 A1 | 11/2018 |
| WO | 2019046649 A1 | 3/2019 |
| WO | 2019077307 A1 | 4/2019 |
| WO | 2019079350 A3 | 4/2019 |
| WO | 2019046649 A8 | 5/2019 |
| WO | 2019122806 A1 | 6/2019 |
| WO | 2019135784 A1 | 7/2019 |
| WO | 2019135796 A1 | 7/2019 |
| WO | 2019135837 A1 | 7/2019 |
| WO | 2019136470 A1 | 7/2019 |
| WO | 2019136471 A1 | 7/2019 |
| WO | 2019136473 A1 | 7/2019 |
| WO | 2019171038 A1 | 9/2019 |
| WO | 2019185973 A1 | 10/2019 |
| WO | 2019185975 A1 | 10/2019 |
| WO | 2019185976 A1 | 10/2019 |
| WO | 2019185977 A1 | 10/2019 |
| WO | 2020168348 A1 | 8/2020 |
| WO | 2020212682 A1 | 10/2020 |
| WO | 2020219092 A1 | 10/2020 |
| WO | 2021032982 A1 | 2/2021 |

(56) References Cited

FOREIGN PATENT DOCUMENTS

| WO | 2021032983 A1 | 2/2021 |
|---|---|---|
| WO | 2021044121 A1 | 3/2021 |

OTHER PUBLICATIONS

International Preliminary Report on Patentability for International Application No. PCT/GB2016/000051, Report dated Sep. 19, 2017, dated Sep. 28, 2017, 7 pgs.
International Preliminary Report on Patentability for International Application No. PCT/GB2016/000065, dated Oct. 3, 2017, dated Oct. 12, 2017, 8 pgs.
International Preliminary Report on Patentability for International Application No. PCT/US2018/012227, Report dated Jul. 30, 2019, dated Aug. 8, 2019, 7 pgs.
International Preliminary Report on Patentability for International Application PCT/US2018/015553, Report dated Jun. 4, 2019, dated Jun. 13, 2019, 6 pgs.
International Preliminary Report on Patentability for International Application PCT/GB2015/000228, dated Feb. 14, 2017, dated Feb. 23, 2017, 11 pgs.
International Preliminary Report on Patentability for International Application PCT/GB2017/000055, dated Oct. 16, 2018, dated Oct. 25 2018, 9 pgs.
International Preliminary Report on Patentability for International Application PCT/US2018/012691, dated Jul. 9, 2019, dated Jul. 18, 2019, 10 pgs.
International Preliminary Report on Patentability for International Application PCT/US2018/056150, Report dated Apr. 21, 2020, dated Apr. 30, 2020, 6 pgs.
International Preliminary Report on Patentability for International Application PCT/GB2017/000040, Report dated Sep. 25, 2018, dated Oct. 4, 2018, 7 pgs.
International Search Report and Written Opinion for International Application No. PCT/US2019/031163, Search completed Jul. 9, 2019, dated Jul. 29, 2019, 11 pgs.
International Search Report and Written Opinion for International Application No. PCT/GB2015/000228, Search completed May 4, 2011, dated Jul. 15, 2011, 15 pgs.
International Search Report and Written Opinion for International Application No. PCT/GB2016/000065, completed Jul. 14, 2016, dated Jul. 27, 2016, 10 pgs.
International Search Report and Written Opinion for International Application No. PCT/GB2017/000055, Search completed Jul. 19, 2017, dated Jul. 26, 2017, 12 pgs.
International Search Report and Written Opinion for International Application No. PCT/US2018/012227, Search completed Feb. 28, 2018, dated Mar. 14, 2018, 8 pgs.
International Search Report and Written Opinion for International Application No. PCT/US2018/015553, completed Aug. 6, 2018, dated Sep. 19, 2018, 12 pgs.
International Search Report and Written Opinion for International Application No. PCT/US2018/037410, Search completed Aug. 16, 2018, dated Aug. 30, 2018, 11 pgs.
International Search Report and Written Opinion for International Application No. PCT/US2018/048636, Search completed Nov. 1, 2018, dated Nov. 15, 2018, 16 pgs.
International Search Report and Written Opinion for International Application No. PCT/US2018/062835, Search completed Jan. 14, 2019, dated Jan. 31, 2019, 14 pgs.
International Search Report and Written Opinion for International Application No. PCT/US2019/012758, completed Mar. 12, 2019, dated Mar. 27, 2019, 9 pgs.
International Search Report and Written Opinion for International Application No. PCT/US2019/012764, completed Mar. 1, 2019, dated Mar. 18, 2019, 9 pgs.
International Search Report and Written Opinion for International Application No. PCT/US2019/064765, Search completed Feb. 3, 2020, dated Mar. 18, 2020, 11 pgs.
International Search Report and Written Opinion for International Application No. PCT/US2020/018686, Search completed Apr. 25, 2020, dated May 22, 2020, 11 pgs.
International Search Report and Written Opinion for International Application No. PCT/US2018/048960, Search completed Dec. 14, 2018, dated Jan. 8, 2019, 14 pgs.
International Search Report and Written Opinion for International Application PCT/US2019/012759, completed Mar. 14, 2019, dated Apr. 15, 2019, 12 pgs.
International Search Report for International Application No. PCT/US2019/065478, Search completed Jan. 29, 2020, dated Feb. 11, 2020, 14 pgs.
International Search Report for PCT/GB2013/000273, completed by the European Patent Office dated Aug. 30, 2013, 4 pgs.
International Search Report for PCT/GB2016/000051, Completed Aug. 11, 2016, 3 pgs.
Written Opinion for International Application No. PCT/GB2013/000273, completed Aug. 30, 2013, dated Sep. 9, 2013, 7 pgs.
Written Opinion for International Application PCT/GB2016/000003, completed May 31, 2016, dated Aug. 12, 2016, 10 pgs.
Dabrowski, "High Birefringence Liquid Crystals", Crystals, Sep. 3, 2013, vol. 3, No. 3, pp. 443-482.
Tondiglia et al., "Holographic Formation of Electro-Optical Polymer-Liquid Crystal Photonic Crystals", Advanced Materials, 2002, Published Online Nov. 8, 2001, vol. 14, No. 3, pp. 187-191.
Yang et al., "Robust and Accurate Surface Measurement Using Structured Light", IEEE, Apr. 30, 2008, vol. 57, Issue 6, pp. 1275-1280.
Liu et al., "Realization and Optimization of Holographic Waveguide Display System", Acta Optica Sinica, vol. 37, Issue 5, dated May 10, 2017, pp. 310-317.

* cited by examiner

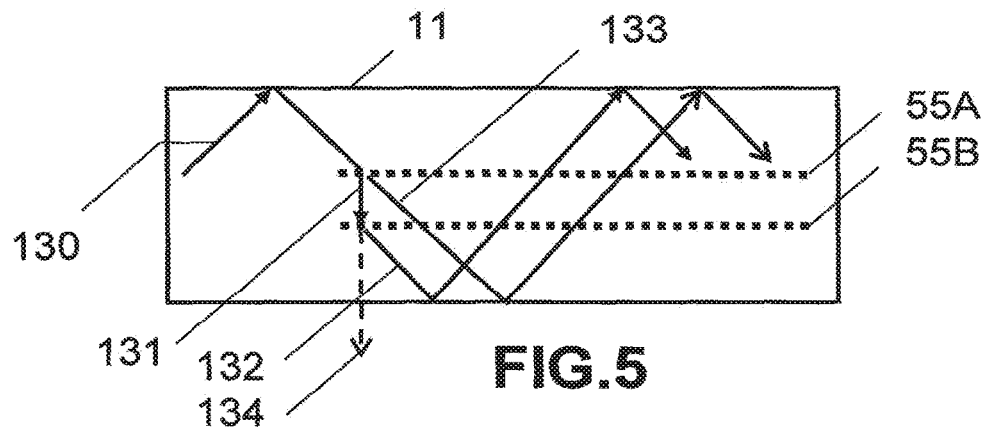
FIG.5
| Diffraction Efficiency (each SBG) | Transmission at each bounce $T = (1-DE) + DE^2$ | Loss per bounce $1-T$ |
|---|---|---|
| 85 | 87.4 | 12.6 |
| 90 | 91.0 | 9.0 |
| 95 | 95.2 | 4.8 |
FIG.6
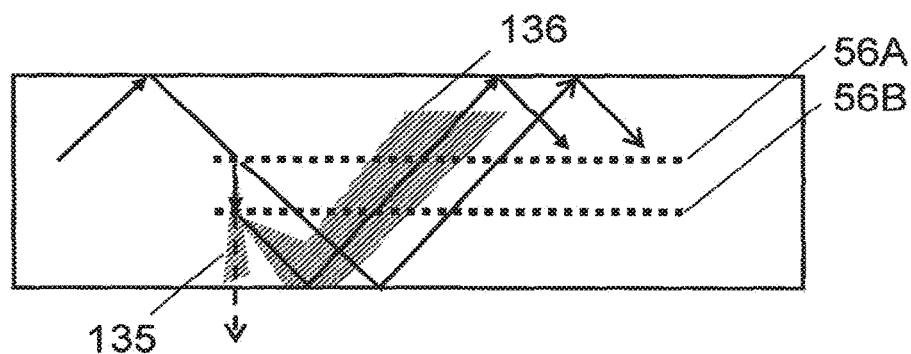
FIG.7

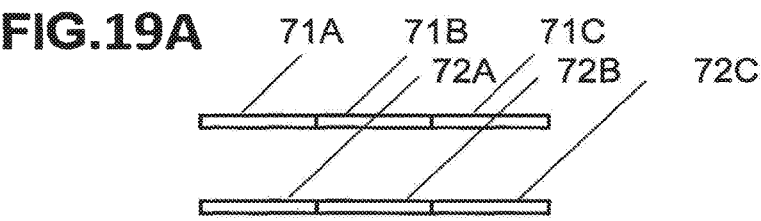
FIG.19A
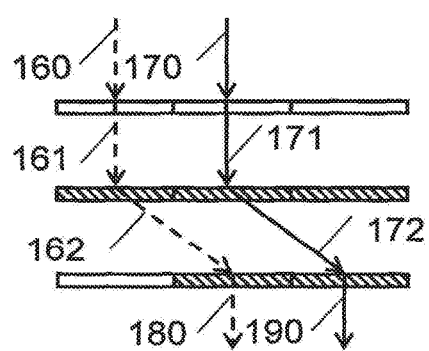
FIG.19B
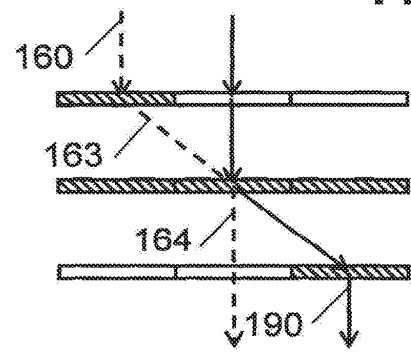
FIG.19C
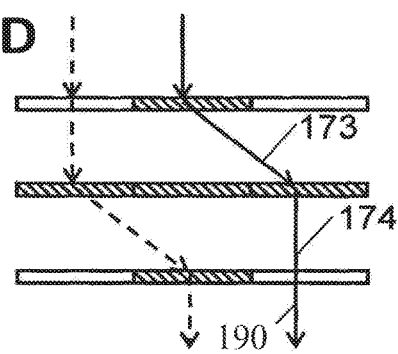
FIG.19D
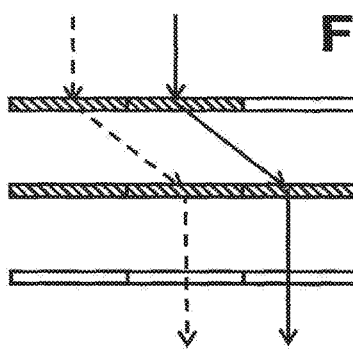
FIG.19E
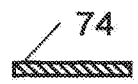 74 DIFFRACTING   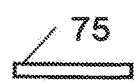 75 CLEAR

WAVEGUIDE LASER ILLUMINATOR INCORPORATING A DESPECKLER

CROSS REFERENCE TO RELATED APPLICATIONS

This Application is a Continuation of U.S. patent application Ser. No. 15/502,583, entitled "Waveguide Laser Illuminator Incorporating a Despeckler," to Popovich et al., filed Feb. 8, 2017 and issued on Jun. 2, 2020 as U.S. Pat. No. 10,670,876, which is the U.S. national phase of PCT Application No. PCT/GB2015/000225, entitled "Waveguide Laser Illuminator Incorporating a Despeckler," to Popovich et al., filed Aug. 4, 2015, which claims the benefit of U.S. Provisional Application No. 61/999,866, entitled "Waveguide Laser Illuminator Incorporating a Despeckler," to Waldern et al., filed Aug. 8, 2014, the disclosures of which are incorporated herein by reference in their entireties.

BACKGROUND OF THE INVENTION

The present invention relates to an illumination device, and more particularly to a laser illumination device based on electrically switchable Bragg gratings that reduces laser speckle.

Miniature solid-state lasers are finding their way into a range of display applications. The competitive advantage of lasers results from increased lifetime, lower cost, higher brightness and improved colour gamut. Although lasers offer much more compact illumination solutions than can be provided with conventional sources such as LED the demand for yet more compressed form factors continues unabated. Classical illumination designs using beam splitters and combiners fail to meet the requirements. It is known that delivering laser illumination via waveguide optics can result in 50% reduction in size compared with conventional lens combiner splitter schemes.

Laser displays suffer from speckle, a sparkly or granular structure seen in uniformly illuminated rough surfaces. Speckle arises from the high spatial and temporal coherence of lasers. Speckle reduces image sharpness and is distracting to the viewer. Several approaches for reducing speckle contrast have been proposed based on spatial and temporal decorrelation of speckle patterns. More precisely, speckle reduction is based on averaging multiple sets of speckle patterns from a speckle surface resolution cell with the averaging taking place over the human eye integration time. Speckle may be characterized by the parameter speckle contrast which is defined as the ratio of the standard deviation of the speckle intensity to the mean speckle intensity. Temporally varying the phase pattern faster than the eye temporal resolution destroys the light spatial coherence, thereby reducing the speckle contrast. Traditionally, the simplest way to reduce speckle has been to use a rotating diffuser to direct incident light into randomly distributed ray directions. The effect is to produce a multiplicity of speckle patterns while maintaining a uniform a time-averaged intensity profile. This type of approach is often referred to as angle diversity. Another approach known as polarization diversity relies on averaging phase shifted speckle patterns. In practice neither approach succeeds in eliminating speckle entirely.

It is known that speckle may be reduced by using an electro optic device to generate variations in the refractive index profile of material such that the phase fronts of light incident on the device are modulated in phase and or amplitude. U.S. Pat. No. 8,224,133 with issue date 17 Jul. 2012 entitled LASER ILLUMINATION DEVICE discloses a despeckler based on a new type of diffractive electro optical device known as an electrically Switchable Bragg Grating (SBG).

There is a need for a compact laser illuminator that efficiently combines waveguide optics with a diffractive electro-optical despeckler.

SUMMARY OF THE INVENTION

It is an object of the present invention to provide an compact laser illuminator based on a waveguide that provides despeckled light output.

The objects of the invention are achieved in a first embodiment comprising a laser; a waveguide comprising at least first and second transparent lamina; a first grating device for coupling light from the laser into a TIR path in the waveguide; a second grating device for coupling light from the TIR path out of the waveguide; and a third grating device for applying a variation of at least one of beam deflection or phase retardation across the wavefronts of the TIR light. The first second and third grating devices are each sandwiched by transparent lamina.

In one embodiment of the invention the third grating device is electrically switchable. Transparent electrodes are applied to portions of transparent lamina sandwiching the grating device gratings. The electrodes substantially overlap the grating device.

In one embodiment of the invention the third grating device is electrically switchable. Transparent interdigitated electrodes are applied to portions of a transparent lamina overlapping the grating device.

In one embodiment of the invention the optical prescription of the third grating device varies along said waveguide.

In one embodiment of the invention the first and second grating devices are grating lamina.

In one embodiment of the invention the third grating device comprises more than one grating lamina adjacently disposed along the waveguide.

In one embodiment of the invention the third grating device comprises a two dimensional array of SBG elements. Transparent electrodes are applied to overlapping portions of transparent lamina sandwiching the SBG elements. At least on of the electrodes is pixelated into elements substantially overlapping the SBG elements.

In one embodiment of the invention the first and second grating devices are SBGs.

In one embodiment of the invention the third grating device is a SBG.

In one embodiment of the invention the illuminator further comprises a fourth grating device for applying variation of at least one of beam deflection or phase retardation across the wavefronts of the TIR light. The third and fourth grating devices overlap. The third and fourth grating devices have identical prescriptions and are configured in a reciprocal sense.

In one embodiment of the invention the third grating device overlaps the first grating device. In one embodiment of the invention the third grating device overlaps the second grating device.

In one embodiment of the invention the third grating device is disposed along the TIR path between the first and second grating devices.

In one embodiment of the invention the third grating device diffuses light into the direction of the TIR path.

In one embodiment of the invention the at least one of the transparent lamina is wedged.

In one embodiment of the invention at least one end of the waveguide is terminated by a reflector.

In one embodiment of the invention the illuminator further comprises a reflector disposed adjacent to an external surface of the waveguide. The reflector comprises a transmission grating and a mirror.

In one embodiment of the invention the at least one end of the waveguide is terminated by a quarter wave plate and a mirror.

In one embodiment of the invention the second grating device comprises overlapping grating lamina separated by a transparent lamina. One grating lamina diffracts S-polarized light and the other grating lamina diffracts P-polarized light.

In one embodiment of the invention there is provided an illumination device comprising: a laser; a waveguide comprising at least first and second transparent lamina; a first grating device comprising an array of selectively switchable grating elements; and a second grating device for coupling light from the TIR path out of the waveguide. The first and second grating devices are each sandwiched by the transparent lamina. Each grating element encode a beam deflector for coupling light from the laser into a TIR path in the waveguide and a lens having a Fourier plane in proximity to an illumination plane of the illumination device A more complete understanding of the invention can be obtained by considering the following detailed description in conjunction with the accompanying drawings, wherein like index numerals indicate like parts. For purposes of clarity, details relating to technical material that is known in the technical fields related to the invention have not been described in detail.

BRIEF DESCRIPTION OF THE DRAWINGS

FIG. 5 is a side elevation view showing a detail of a beam grating interaction in a waveguide despeckler in one embodiment.

FIG. 6 is a table showing the diffraction efficiency, transmission and waveguide transmission loss for a waveguide despeckler in one embodiment.

FIG. 7 is a side elevation view showing a detail of a beam grating interaction in a waveguide despeckler in one embodiment.

FIG. 19A is a side elevation view of grating configuration used in a waveguide despeckler in one embodiment.

FIG. 19B illustrates a first operational state of the grating configuration of FIG. 19A.

FIG. 19C illustrates a second operational state of the grating configuration of FIG. 19A.

FIG. 19D illustrates a third operational state of the grating configuration of FIG. 19A.

FIG. 19E illustrates a fourth operational state of the grating configuration of FIG. 19A.

DETAILED DESCRIPTION OF THE INVENTION

Figure 1:
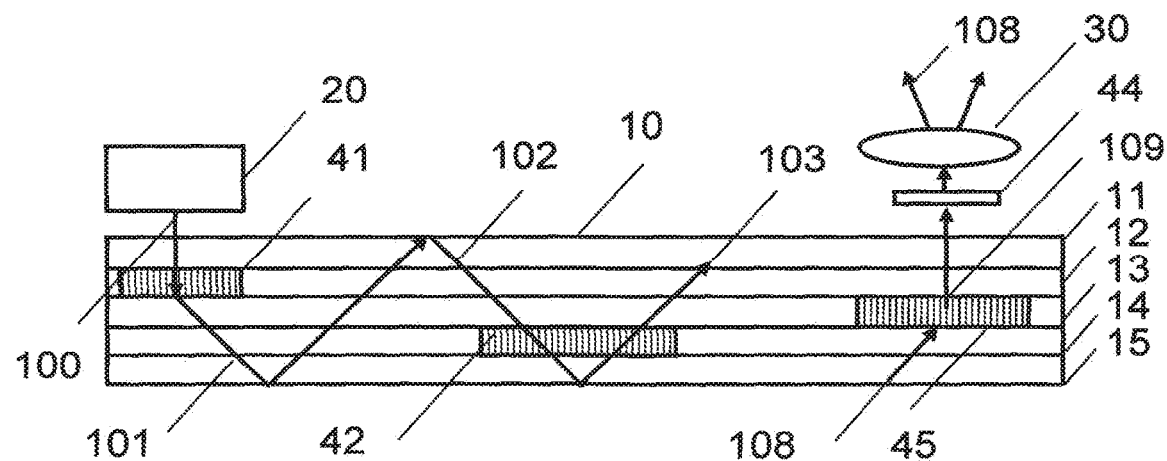
FIG. 1 is a side elevation view of a waveguide despeckler in one embodiment.

The invention will now be further described by way of example only with reference to the accompanying drawings.

It will apparent to those skilled in the art that the present invention may be practiced with some or all of the present invention as disclosed in the following description. For the purposes of explaining the invention well-known features of optical technology known to those skilled in the art of optical design and visual displays have been omitted or simplified in order not to obscure the basic principles of the invention.

Unless otherwise stated the term "on-axis" in relation to a ray or a beam direction refers to propagation parallel to an axis normal to the surfaces of the optical components described in relation to the invention. In the following description the terms light, ray, beam and direction may be used interchangeably and in association with each other to indicate the direction of propagation of light energy along rectilinear trajectories.

Parts of the following description will be presented using terminology commonly employed by those skilled in the art of optical design.

It should also be noted that in the following description of the invention repeated usage of the phrase "in one embodiment" does not necessarily refer to the same embodiment.

One important class of diffractive optical elements is based on Switchable Bragg Gratings (SBGs). SBGs are fabricated by first placing a thin film of a mixture of photopolymerizable monomers and liquid crystal material between parallel glass plates. One or both glass plates support electrodes, typically transparent indium tin oxide films, for applying an electric field across the film. A volume phase grating is then recorded by illuminating the liquid material (often referred to as the syrup) with two mutually coherent laser beams, which interfere to form a slanted fringe grating structure. During the recording process, the monomers polymerize and the mixture undergoes a phase separation, creating regions densely populated by liquid crystal micro-droplets, interspersed with regions of clear polymer. The alternating liquid crystal-rich and liquid crystal-depleted regions form the fringe planes of the grating. The resulting volume phase grating can exhibit very high diffraction efficiency, which may be controlled by the magnitude of the electric field applied across the film. When an electric field is applied to the grating via transparent electrodes, the natural orientation of the LC droplets is changed causing the refractive index modulation of the fringes to reduce and the hologram diffraction efficiency to drop to very low levels. Note that the diffraction efficiency of the device can be adjusted, by means of the applied voltage, over a continuous range. The device exhibits near 100% efficiency with no voltage applied and essentially zero efficiency with a sufficiently high voltage applied. In certain types of HPDLC devices magnetic fields may be used to control the LC orientation. In certain types of HPDLC phase separation of the LC material from the polymer may be accomplished to such a degree that no discernible droplet structure results.

SBGs may be used to provide transmission or reflection gratings for free space applications. SBGs may be implemented as waveguide devices in which the HPDLC forms either the waveguide core or an evanescently coupled layer in proximity to the waveguide. In one particular configuration to be referred to here as Substrate Guided Optics (SGO) the parallel glass plates used to form the HPDLC cell provide a total internal reflection (TIR) light guiding structure. Light is "coupled" out of the SBG when the switchable grating diffracts the light at an angle beyond the TIR condition. SGOs are currently of interest in a range of display and sensor applications. Although much of the earlier work on HPDLC has been directed at reflection holograms transmission devices are proving to be much more versatile as optical system building blocks.

Typically, the HPDLC used in SBGs comprise liquid crystal (LC), monomers, photoinitiator dyes, and coinitiators. The mixture frequently includes a surfactant. The patent and scientific literature contains many examples of material systems and processes that may be used to fabricate SBGs. Two fundamental patents are: U.S. Pat. No. 5,942,157 by Sutherland, and U.S. Pat. No. 5,751,452 by Tanaka et al. both filings describe monomer and liquid crystal material combinations suitable for fabricating SBG devices.

One of the known attributes of transmission SBGs is that the LC molecules tend to align normal to the grating fringe planes. The effect of the LC molecule alignment is that transmission SBGs efficiently diffract P polarized light (ie light with the polarization vector in the plane of incidence) but have nearly zero diffraction efficiency for S polarized light (ie light with the polarization vector normal to the plane of incidence. Transmission SBGs may not be used at near-grazing incidence as the diffraction efficiency of any grating for P polarization falls to zero when the included angle between the incident and reflected light is small. A glass light guide in air will propagate light by total internal reflection if the internal incidence angle is greater than about 42 degrees. Thus the invention may be implemented using transmission SBGs if the internal incidence angles are in the range of 42 to about 70 degrees, in which case the light extracted from the light guide by the gratings will be predominantly p-polarized.

The objects of the invention are achieved in a first embodiment shown in FIG. 1 comprising a laser 20 for illuminating a microdisplay 30; a waveguide 10 comprising transparent lamina 11-15; a first grating device 41 for coupling light from the laser into a TIR path in the waveguide; a second grating device 45 for coupling light from the TIR path out of the waveguide; and a third grating device 42 for applying a variation of at least one of beam deflection or phase retardation across the wavefronts of the TIR light. The third grating device essentially provides despeckling and beam homogenization according to the principles of the SBG array devices disclosed in U.S. Pat. No. 8,224,133 by Popovich et al entitled LASER ILLUMINATION DEVICE. Input collimated light 100 from the laser is diffracted into a TIR path 101 by the first grating device. TIR light 102 incident at the third grating device has at least one of its angle or phase varied across its wavefront to provide despeckled and homogenized light 103.

The first grating is sandwiched by transparent lamina 11,13. The second grating device is sandwiched by the transparent lamina 12,14. The third grating device is sandwiched by the transparent lamina 13,15. Note that the thicknesses shown in FIG. 1 are greatly exaggerated. Typically, the lamina, which may be glass or optical plastics, are of thickness 500 micron but may be as thin as 100 micron or as thick as 500 micron. The layers may have different thicknesses. In contrast the grating devices are very thin, typically in the range 1.8 to 3 microns. The invention does not assume the grating devices lie indifferent layers of the waveguide structure as shown in FIG. 1. The only requirement is that each grating device is sandwiched by two transparent lamina. Desirably, to achieve the thinnest waveguide architecture all three devices would be sandwiched between common transparent lamina.

TIR proceeds up to the second grating device which diffracts TIR light indicated by 108 out of the waveguide and onto the microdisplay 30. The image modulated light from the microdisplay is then projected into the beam 108 by projection lens 31.

Figure 2:
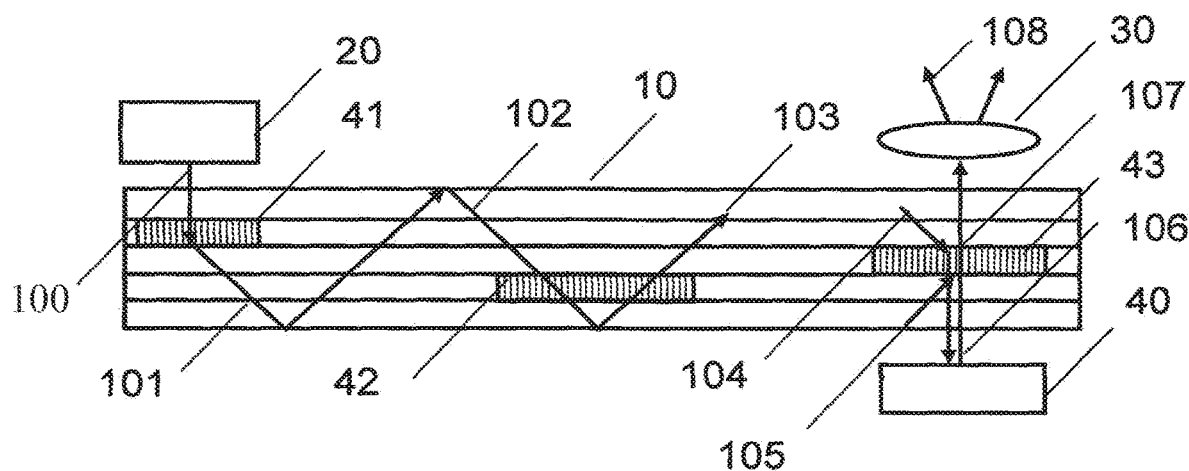
FIG. 2 is a side elevation view of a waveguide despeckler in one embodiment.

In one embodiment of the invention shown in FIG. 2 the microdisplay is a reflective device. In this case the second diffractive device 43 performs the dual functions a beam deflector and a beam splitter according to the principles disclosed in U.S. Pat. No. 6,115,152 by Popovich et al entitled HOLOGRAPHIC ILLUMINATION SYSTEM. In the case of FIG. 2 the second grating device is an SBG which preferentially diffracts P-polarised light. Despeckled, homogenized P-polarized light 104 is diffracted as light 105 towards the microdisplay 40 which is an LCoS device. The image modulated light 106 reflected from the LCoS has its polarization rotated from P to S and consequently is transmitted through the second grating device and without substantial deviation as image light 107 which leaves the waveguide and is projected by the lens 30 into the output beam 108.

To simplify the explanation of the invention the individual laminas will not be shown in the following drawings. It will also be assumed that the third grating device comprises SBG grating lamina (configure as SBG arrays) in various configurations to be described below. Transparent electrodes which are not shown in the drawings are applied to portions of transparent lamina sandwiching the grating device gratings. The electrodes substantially overlap the grating device providing electric fields at ninety degrees to the grating lamina.

In one embodiment of the invention the electrodes are transparent interdigitated electrodes which are applied to portions of a transparent lamina overlapping the grating device providing electric fields substantially parallel to the grating lamina. Normally the first and second gratings are not required to switch and do not need to SBGs. However, it may still be advantages to use non-switching SBGs owing to the higher refractive index modulation from HPDLC and hence higher diffraction efficiency.

Figure 3:
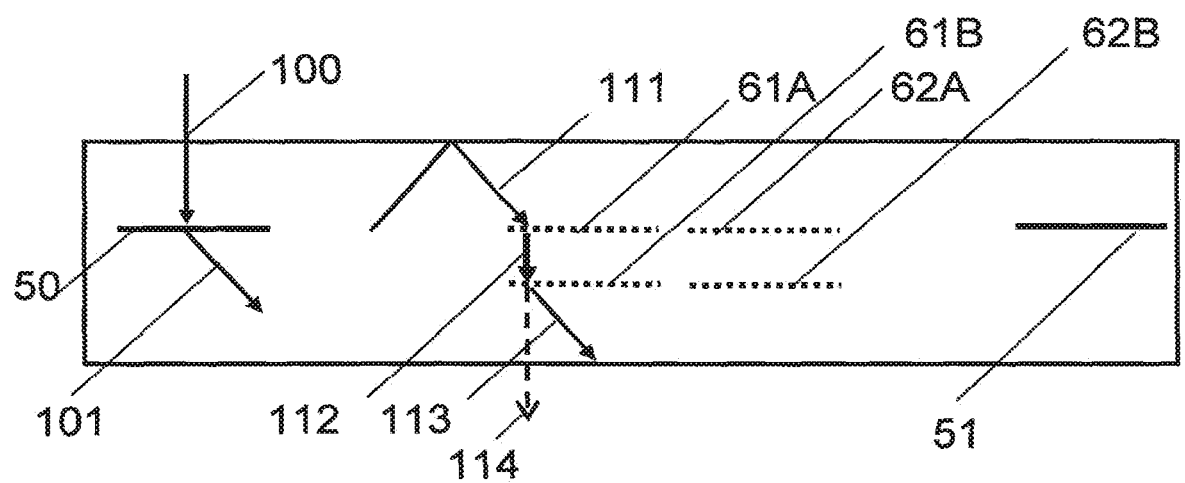
FIG. 3 is a side elevation view of a waveguide despeckler in one embodiment.

The invention allows several different ways of configuring the third grating device. In one embodiment of the invention the optical prescription of the third grating device varies along said waveguide. The third grating device may comprise more than one grating lamina adjacently disposed along the waveguide. The third grating device may also compromise more than one layer. These features are illustrated in the embodiment of the invention shown in FIG. 3 where we see that the third grating device uses two reciprocal overlapping SBG layers with each layer comprising two adjacent grating lamina. By reciprocal we mean that the gratings have identical prescriptions so that by symmetry a ray input a give angle leaves the second grating at the same angle after diffraction at each grating. In the case of FIG. 3 the reciprocal gratings pairs are 61A,61B and 62A,62B. If we consider the first pair we see that incident TIR light 11 is diffracted in the direction 112 by grating 61A and is then diffracted into the direction 113 parallel to the ray direction 112 by the grating 61B. Note that some of the light incident at each grating is not diffracted and continues to propagate as zero order light. In the case of diffraction at the grating 61A the 0-order light will continue along the TIR path. However, the zero order light at grating 61B, which will be substantially normal to the grating and consequently below the critical angle for TIR, will leave the waveguide. To minimise such losses it is desirable that the gratings have high diffraction efficiency. It should be light not diffracted by the first grating 61A may be out coupled by the second grating 61B and similarly for the gratings 62A,62B. Additionally, if layer 61A is diffracting and the desire is to switch layer 61B clear to increase phase diversity, light will be lost (such as the ray 114 indicated by dashed line). The solution to this problem is to introduce an intermediate non switching grating layer between the gratings 61A,62A (and 62A,62B) as will be discussed later.

Figure 4:
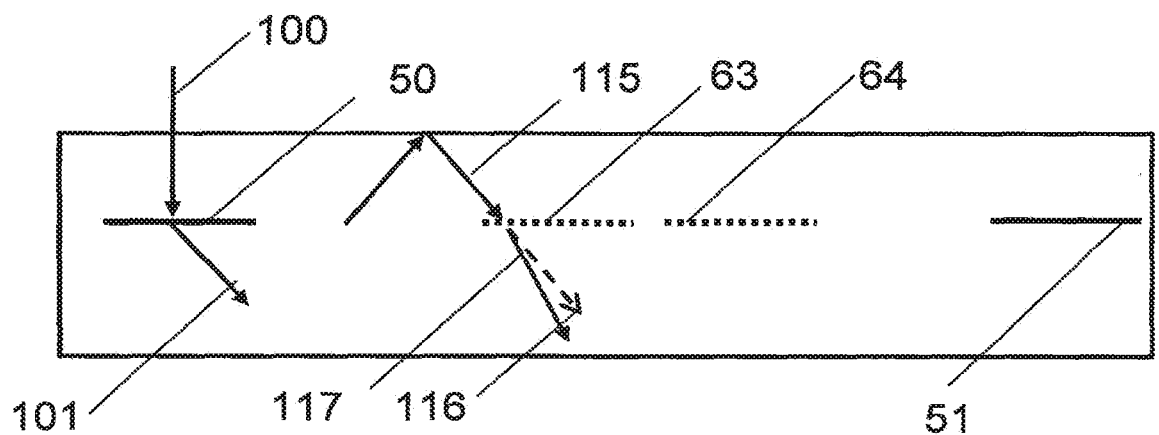
FIG. 4 is a side elevation view of a waveguide despeckler in one embodiment.

In the embodiment of the invention shown in FIG. 4 the third grating device comprises two adjacently disposed grating lamina 63,64 that each provide weak diffraction or scattering of TIR light. Hence incident TIR ray 115 is diffracted into the ray direction 117 and zero order ray direction 116. Where there are multiple (N) despeckler grating interactions within waveguide the despeckling process will benefit from N convolutions of despecklers/diffuser function. Ideally, the same integer number of interactions will occur regardless of which despeckler gratings are switched on/off.

FIG. 5 shows a detail of the embodiment of FIG. 3. The diffracted light of an incident TIR ray 130 is represented by the rays 131,132 The 0 order light at grating 51A ie follows the path labelled 133 and 0 order light at grating 51B is indicated by 134. FIG. 6 is a table shows the light loss per TIR bounce for different SBG efficiencies where the transmission T at each bounce is given by the formula $T=(1-DE)+DE^2$ where DE is the diffraction efficiency. Ignoring absorption, scatter and other losses the transmission loss at each bounce is then equal to $1-T$.

In one embodiment of the invention shown in FIG. 7 which is similar to one shown in FIG. 3 the gratings 56A,56B, which are reciprocal, encode diffusion in addition to their basic beam deflecting properties. The procedures for recording diffusing gratings are well known to those skilled in the art of holography. The beam diffusion is indicated by the shaded regions 135,136. Each beam-grating interaction results in beam angle broadening, resulting in weaker diffraction. While this scheme will enhance despeckling and homogenisation it requires careful design of the grating prescriptions to avoid losses.

Figure 8:
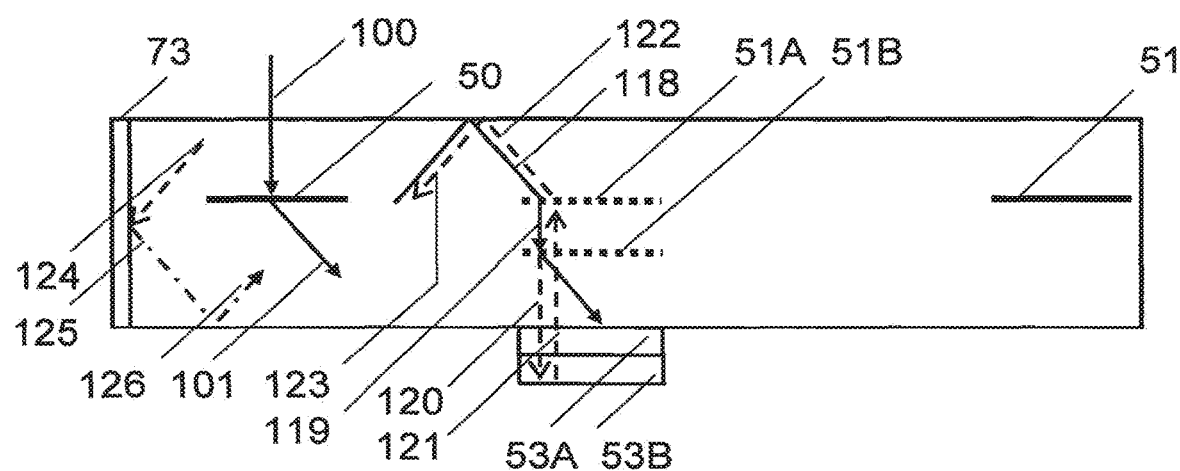
FIG. 8 is a side elevation view of a waveguide despeckler in one embodiment.

FIG. 8 illustrates one strategy for overcoming 0-order losses in the two layer design. The illuminator further comprises a reflector overlapping the third grating device and further comprises a mesoporous layer 53A of near unity refractive index and a mirror 53B. The third grating device comprises the reciprocal grating pair 51A, 51B which provides the diffracted ray path 118,119. The 0 order light 120 is reflected by the mirror 53B in the ray path 121,122 which undergoes TIR back to the input end of the waveguide where is reflected at the mirror 73 as indicated by the ray paths 124-126 resuming the original TIR path The light diffracted out of the waveguide is bounced back into the waveguide off an external mirror and a mirror at the input end of the WG re-directs the light into the correct TIR direction. The mesoporous layer ensures that TIR is maintained for the non diffracted light. To counter the risk is that light may get diffracted out again by the input grating a quarter wave plate may be disposed in front of the external mirrors.

Figure 9:
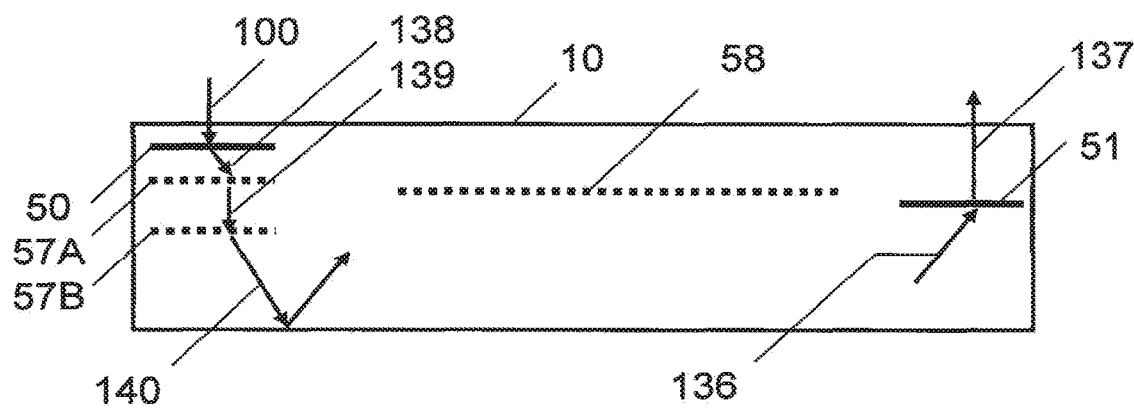
FIG. 9 is a side elevation view of a waveguide despeckler in one embodiment.
Figure 10:
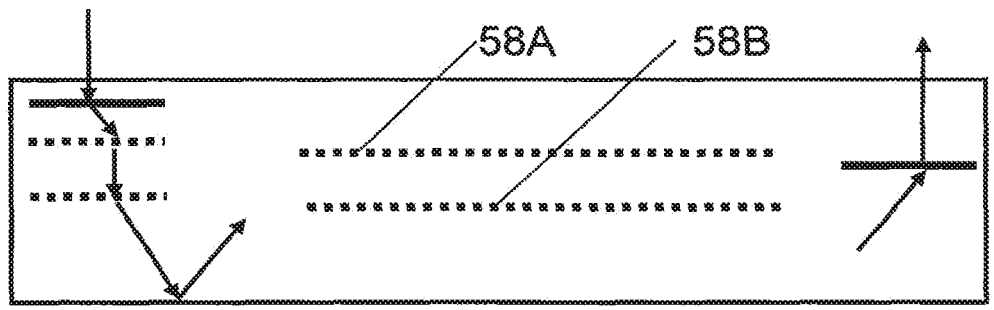
FIG. 10 is a side elevation view of a waveguide despeckler in one embodiment.

The third grating device does not necessarily need to be disposed in the TIR path between the first and second grating devices. As shown in FIG. 9, a third grating device comprising the reciprocal grating pair 57A,57B may be disposed at then input end of the waveguide overlapping the first grating device indicated by 50. By adding a further despeckling and homogenising gating device 58 it is possible to achieve better control of speckle contrast and beam homogeneity. The device 58 should be understood to represent any of the despeckling and homogenisation devices disclosed in the present application. FIG. 9 indicates that the device may be implemented in as single layer. However, a more typical implementation illustrated in FIG. 10 would use two reciprocal gratings as discussed above. In one embodiment of the invention the third grating device may be disposed at the output end of the waveguide overlaps the second grating device.

Figure 11:
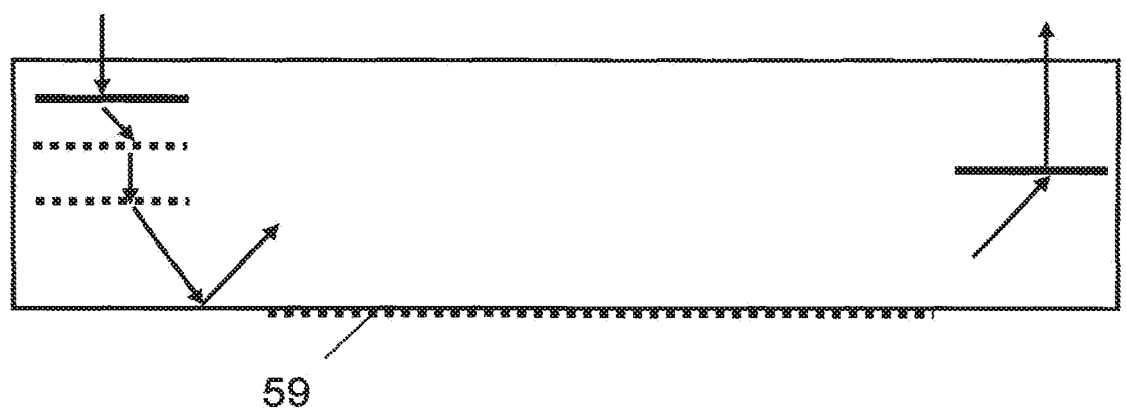
FIG. 11 is a side elevation view of a waveguide despeckler in one embodiment.
Figure 12A:
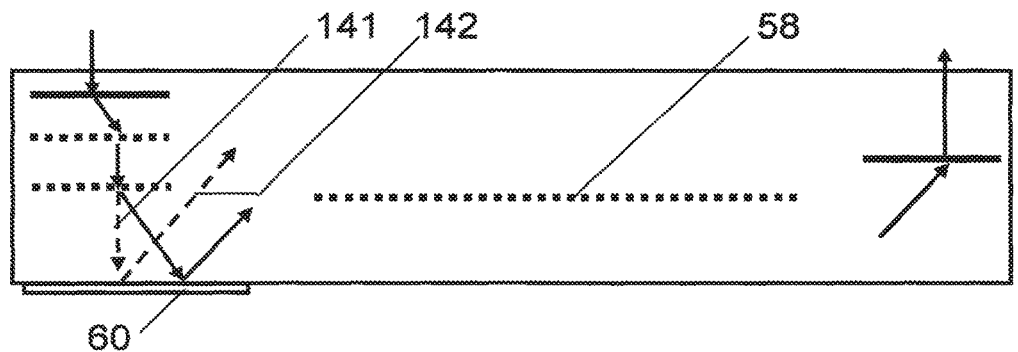
FIG. 12A is a side elevation view of a waveguide despeckler in one embodiment.
Figure 12B:
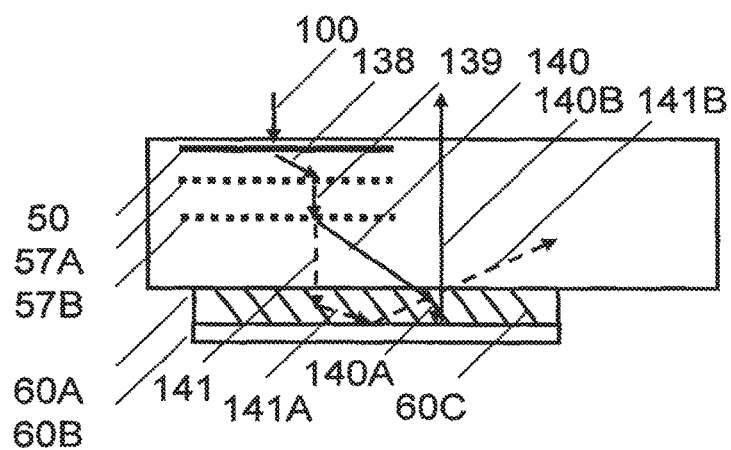
FIG. 12B is a side elevation view of a detail of a waveguide despeckler similar to the one illustrated in FIG. 12A showing the interaction of the beam with the input gratings and reflection grating disposed near a reflecting surface of the waveguide.
Figure 12C:
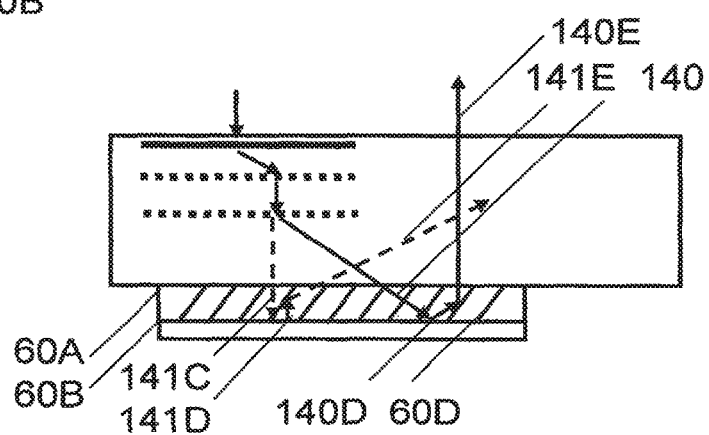
FIG. 12C is a side elevation view of a detail of a waveguide despeckler similar to the one illustrated in FIG. 12A showing the interaction of the beam with the input gratings and reflection grating disposed near a reflecting surface of the waveguide.

FIG. 11 shows an embodiment of the invention that increases angular diversity using a randomly scattering surface structure 59. The latter may be a slightly roughened surface. Alternately the surface structure may comprise a weak blazed grating. In the embodiment of the invention shown in FIG. 12A the illuminator further comprises a reflector 60 disposed on an outer surface of the waveguide and overlapping the third grating device. The purpose of the reflector is to redirect zero order light back into the TIR path. The reflector may comprise a reflection holographic grating with a diffraction angle equal to the waveguide TIR angle. Alternatively, the reflector may comprise a transmission holographic grating with a mirror coating. The grating steers the 0 order light into TIR. Since this light will be off-Bragg after being reflected at the mirror coating it is not diffracted and re-enters the waveguide at the TIR angle. However, grating reciprocity issues can arise in such embodiments as indicated in FIGS. 12B-12C which show reflectors comprising a transmission grating 60A, and a mirror 60B for two different and opposing grating slant angles indicated by 60C and 60D. In such cases the diffracted light at the TIR angle will be reciprocally out-coupled by the transmission after reflection from the mirror. For example, turning first to FIG. 12B we see that zero order light 141 from the grating 57B is diffracted by the grating 60A into the path 141A and is then reflected at the mirror 60B into off-Bragg path 141B. The directed light 140 from grating 57B is also diffracted by the grating 60A, into the path 140A and is reflected upwards through the waveguide. Referring next to FIG. 12C we see that zero order light 141 from the grating 57B is off Bragg at the grating 60A. After reflection at the mirror 60B the light is on-Bragg and is diffracted by grating 60A into the direction 141E. Light 140 diffracted by the grating 57B is off-Bragg at the grating 60A. After reflection at the mirror the light is on-Bragg and is diffracted by grating 60A upwards into the direction 140E which passes through the waveguide. Note that if the reflection grating is used to cover the left half area under the input light coupling grating only, then no loss of light diffracted light greater than the critical angle will occur.

Figure 13:
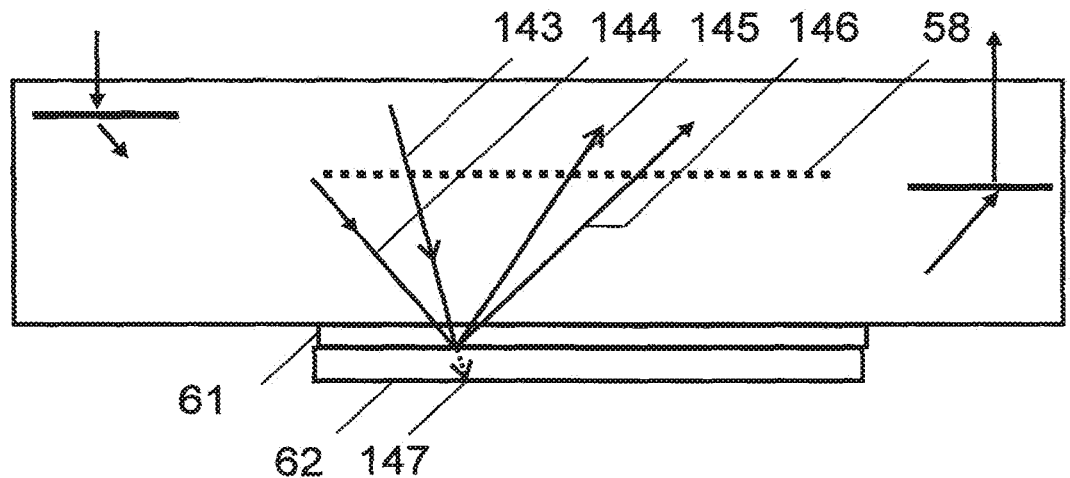
FIG. 13 is a side elevation view of a waveguide despeckler in one embodiment.

FIG. 13 illustrates an embodiment of the invention direction that overcomes the problem of leakage from the waveguide which occurs as a consequence of the increasing angular diversity along the TIR path. Again, the reflector could be a reflection hologram or transmission grating 61 and mirror 62 as illustrated. The ray 143 which is below the critical angle is diffracted into TIR ray 145 by the hologram. The ray 144 which exceeds the critical angle lies outside the grating angular bandwidth is reflected into the ray 146 at the air interface and continues to undergo TIR.

Figure 14:
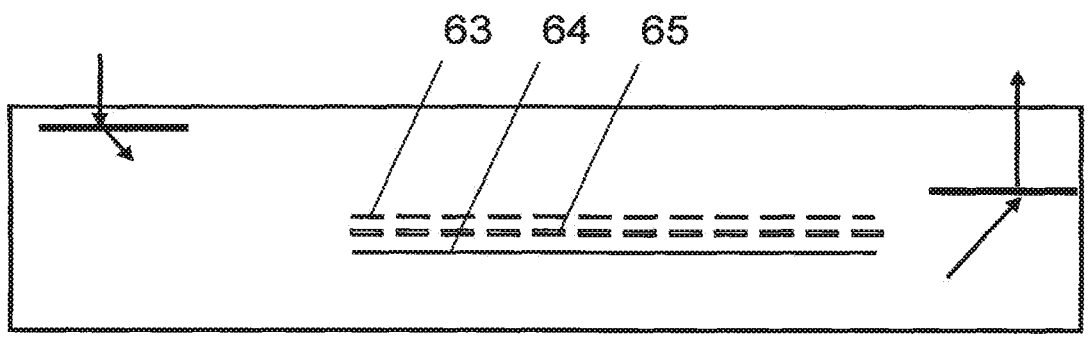
FIG. 14 is a side elevation view of a waveguide despeckler in one embodiment.
Figure 15:
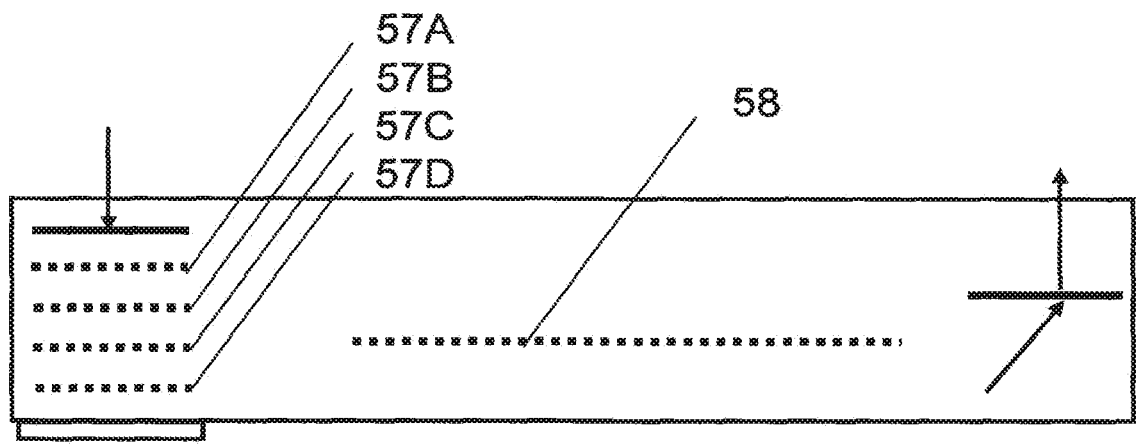
FIG. 15 is a side elevation view of a waveguide despeckler in one embodiment.

In one embodiment of the invention shown in FIG. 14 the third grating device comprises a two dimensional array of SBG elements each element being switched at high speed. Transparent electrodes 63,64 are applied to overlapping portions of transparent lamina sandwiching the SBG elements. At least one of the electrodes is pixelated into elements 63 substantially overlapping the SBG elements 64. The SBG elements may have varying grating vectors to provide angular diversity beam deflection. Alternatively, the grating elements may encode sub wavelength gratings to provide varying phase retardation. The diffracting properties of the grating elements may vary with position along the waveguide. In one embodiment of the invention shown in FIG. 15 the third grating device which overlaps the first grating device further comprises 57A,57B 57C,5D. The four layers are each optimised for different angular bandwidth ranges to provide high efficiency diffraction over a large field angle.

Figure 16:
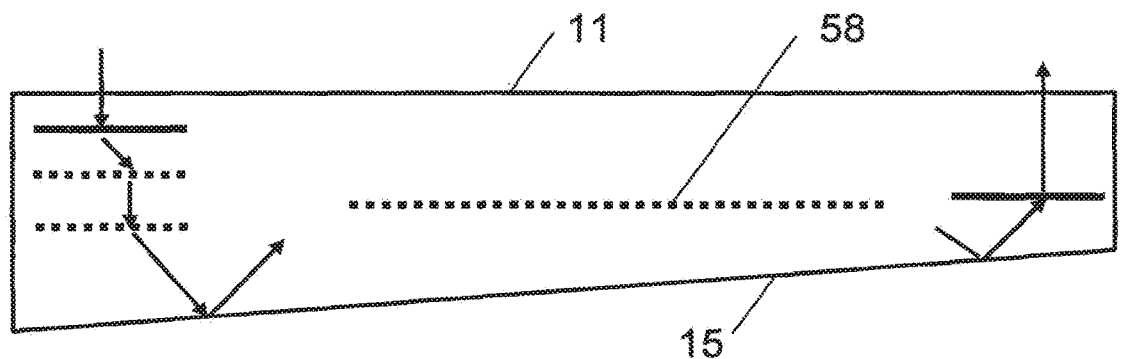
FIG. 16 is a side elevation view of a waveguide despeckler incorporating a wedge in one embodiment.
Figure 17:
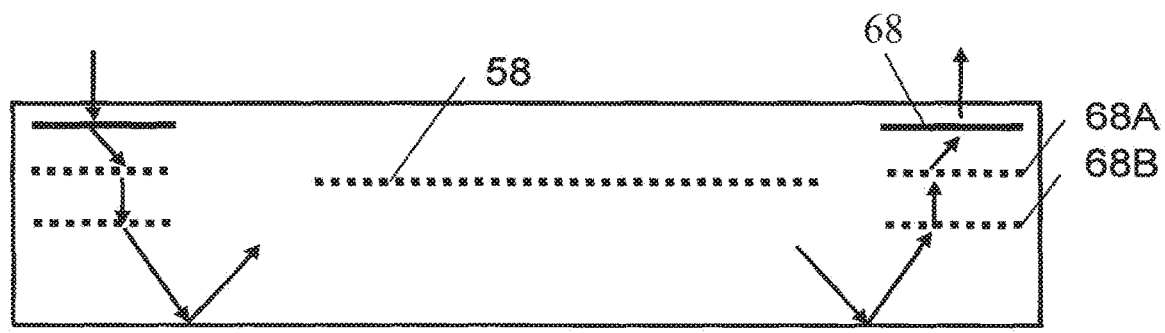
FIG. 17 is a side elevation view of a waveguide despeckler in one embodiment.

In one embodiment of the invention shown in FIG. 16 a thin wedge is added to the embodiment of FIG. 9 to create a wedged waveguide. The wedge angle helps to increase angular diversity. In one embodiment of the invention the third grating device may be disposed at the output end of the waveguide overlapping the second grating device. As shown in FIG. 17 the third grating device comprise the reciprocal gratings 68A, 68B. Implementations of the third grating device may be provided at both the input and output ends of the waveguides as also illustrated in FIG. 17. Further angular and phase diversity despeckling and homogenisation along the waveguide may be provided by the spatially varying birefringence of the SBG; bulk PDLC scattering and surface roughness.

Figure 18:
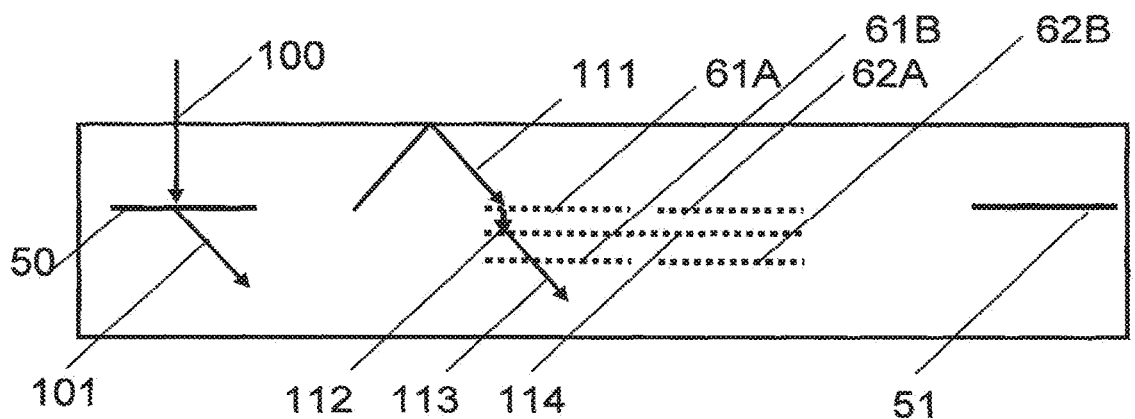
FIG. 18 is a side elevation view of a waveguide despeckler in one embodiment.

The embodiment of FIG. 18 is similar to that of FIG. 3 but further comprises a passive non switching grating layer 70. A typical portion of the TIR light path passing through the gratings 61A, 70,61B is indicated by the rays 151-154. Only the gratings 61A,61B (and 62A,62B) are required to switch. To meet the requirements of reciprocity all gratings diffract at the same angle and each of the switching layers is the inverse of the other. Note also that the invention is not restricted to any particular numbers of reciprocal grating pairs such as 61A,61B. It is also important to remark that the above configuration results in only one drive signal and an inverse function being required. FIG. 19A show the operational states of the three grating layers illustrated in FIG. 18 where the layers labelled by the numerals 71-73 are details of the grating layers 61A,61B. Three elements (labelled by A-C) of the grating arrays formed in each layer are shown. Four operational states of the grating elements are shown in FIGS. 19B-19E where element in a diffracting state are shaded as indicated by 74 and elements in a clear or non diffracting state are not shaded as indicted by 75. Note that the intermediate layer elements are allows in a diffracting state. In each case the light 160. 170 enters via elements 71A, 71B and leaves 180. 190 via the at elements 73B, 73C. There are therefore 2 paths for any one given cell or 2 modes per element. For example in FIG. 19B the paths from elements 71A, 71B are indicated by 160,161,162,180 and 170,171,172,190. The alternative path from cell 71A as shown in FIG. 19C is 160,163,164,190. It should be apparent from the study of FIG. 19 that the number of possible modes for light entering the elements 71A,71B as illustrated is $2^N$ where N=2, that is $2^2$=4 modes. This is equivalent to 4 different phase states that can be used for speckle averaging. The number of states increases dramatically as we increased the array size. For example with 30 columns, following the logic of FIG. 19, we have $2^{30}$ (ie over 1 billion) possible modes.

Figure 20:
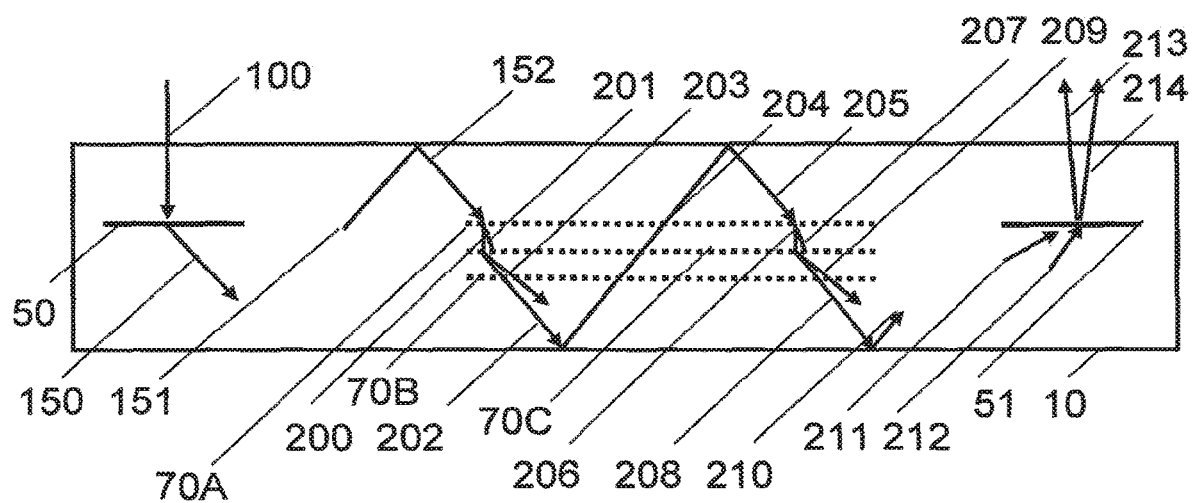
FIG. 20 is a side elevation view of a waveguide despeckler in one embodiment.

FIG. 20 illustrates one embodiment of the three grating layer scheme of FIGS. 18-19 which applies the low angle diffraction principle illustrated in FIG. 4. The gratings in the three layer stack comprises the switching gratings 70A,70B and the no switching grating 70C. The ray path from the input coupling grating 50 to the output coupling grating 51 is indicated by the rays 150-152 and 200-212. The diffusion of light at the upper switching grating 70A is represented by the rays 200,201 at the first interaction and 206,207 at the second interaction. The diffusion of light at the non switching grating 70C is represented by the rays 202,203 at the first interaction and 208,209 at the second interaction. The light, generally indicated by 211,212 incident at the output grating 51 is diffracted in diffuse output beam indicated by 213,214. Note that rays reflected from the lower waveguide face such as 204 are off-Bragg. Each grating provides diffraction over a small angular bandwidth centers on the chief ray path, that is, the path in which the rays incident on the active grating exactly satisfy the reciprocity condition. Repeated diffusion by successive beam grating interactions leads to a progressively increasing angle cone. Since the angular content of the despeckled light typically remains small it can be efficient output by the grating 51 which advantageously encodes a diffusion function to match the numerical aperture required by the microdisplay. Small sections of the gratings 70A,70B are switching on and off to achieve speckle averaging. The grating prescriptions must be optimised to provide a fixed output cone angle and average intensity at the output grating. In other embodiments of the invention more grating layers may be used to provide more speckling averaging states. The grating may comprise single lain extending over an appreciable length of the waveguide as shown in FIG. 20 or may be split in to speared space gratings as shown in FIG. 18. Note that the input and output gratings should be of high efficiency but since they are used in in an illumination system it is not essential that they are reciprocal.

Approaches to speckle reduction based on diffusion suffer from the problem that assigning random phases to each speckle cell will require a large number of phase patterns to achieve the maximum theoretical speckle reduction. In one embodiment of the invention the gratings may be configured according to the principles of Hadamard diffusers as disclosed in U.S. Pat. No. 8,224,133 with issue date 17 Jul. 2012 entitled LASER ILLUMINATION DEVICE. The principles of Hadamard phase plates are well known in the optical data processing literature. Hadamard diffusers offer the advantage of a short phase correlation length allowing the target speckle diversity to be achieved more easily. Phase patterns based on N×N Hadamard matrix allow the eye resolution spot to be partitioned into N×N phase cells with a prescribed combination of pi and 0 radian phase shifts. By providing the permutations of rows and columns according to Hadamard theory a set of $N^2$ Hadamard phase patterns is generated providing considerable economy in terms of the number of phase patterns. When these phase patterns are presented within the eye integration time with equal weight $N^2$ independent speckles are produced resulting in speckle contrast reduction by a factor of N. The corresponding classical N×N diffuser using random phase would in theory require an infinite number of phase patterns to achieve the same speckle contrast. Although configuring SBG arrays to operate as Hadamard diffusers may be advantageous fort the reasons given above, in some cases, diffuser displacements can easily be achieved using the conventional diffusing structures already discussed. Small size, cost and complexity requirements in certain despeckler applications may limit the number of elements in the array. Where the number of cells is limited a reasonable strategy would be to optimize diffuser characteristics for the number of cells available.

Figure 21:
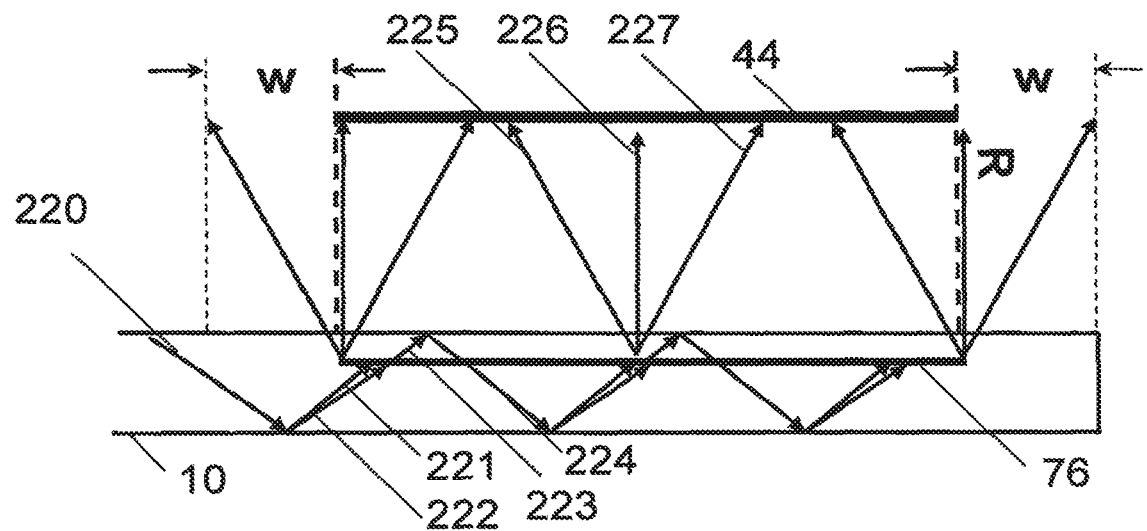
FIG. 21 is a side elevation view of a detail of waveguide despeckler in one embodiment showing the illumination path through the output grating onto a microdisplay.
Figure 22:
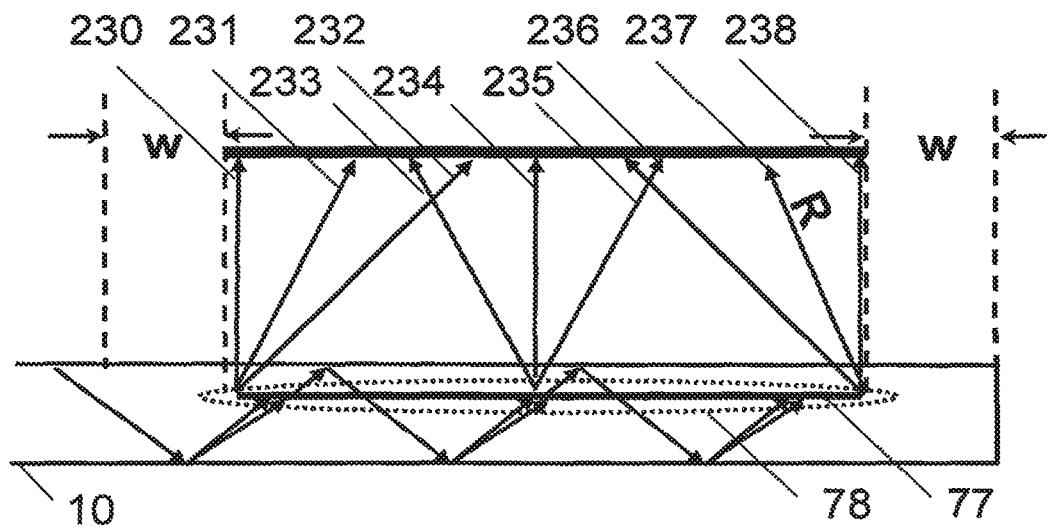
FIG. 22 is a side elevation view of a detail of waveguide despeckler in one embodiment showing the illumination path through the output grating onto a microdisplay.
Figure 23:
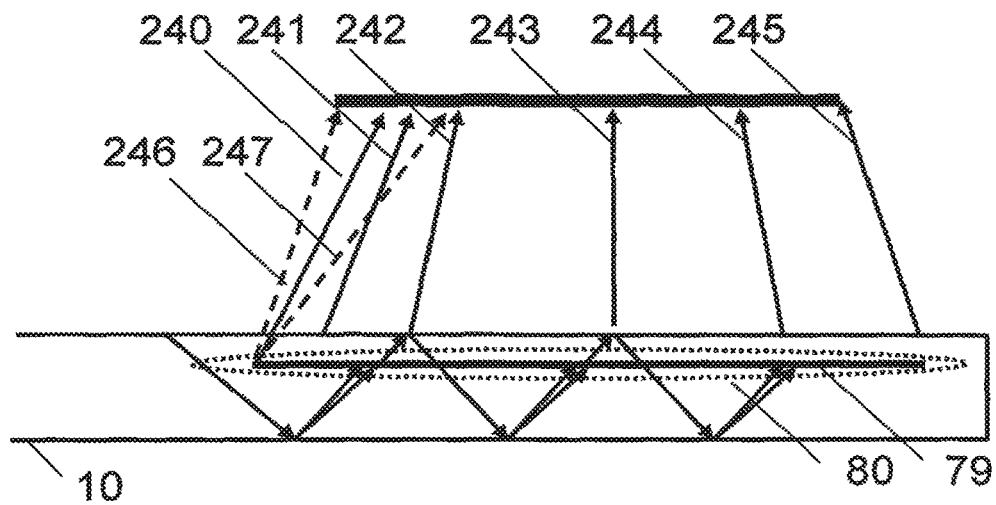
FIG. 23 is a side elevation view of a detail of waveguide despeckler in one embodiment showing the illumination path through the output grating onto a microdisplay.

FIGS. 21-23 illustrates output grating designs for use in the embodiments of FIGS. 18-20. The guided despeckled light is indicated by the rays 220-225 with the diffusion resulting from the despeckling gratings, discussed above, and indicated by 221,222 and 223,224. The grating extracts uniform portions of the despeckled light along its length to provide uniformly diffused despeckled light over the aperture of the microdisplay 44. Such a loss grating is provided by having a refractive index modulation that is relatively low at the end nearest the input end of the waveguide rising to a maximum value at the further end of the grating. Depending on the exact shape of the output illumination profile may possible index modulation versus spatial location prescription may be used. In the embodiment illustrated in FIG. 21 the output grating is a beam deflector encoding diffusion characteristics to provide illumination over a cone defined by the rays 225-227. The cone radius at the illumination plane (ie microdisplay active surface) is indicated by the symbol w and the cone axis indicated by the symbol R is normal to the illumination plane. To minimize the overfull of the microdisplay the output grating may also incorporate optical power. In the embodiment of FIG. 22 the output grating 77 encodes the properties of the lens indicated by 78 which provides the on-axis illumination cone indicated by ray 233-235 and the tilted-in cones represented by 230-232 and 236-238. FIG. 23 show a further embodiment in which the output grating 79 encodes the properties of the lens indicated by 80 which provides more convergent illumination indicated by ray 240-245 where each of the preceding rays is the centre ray of a narrow angle cone such as the one represented by rays 246-247. It should be noted that the embodiments of FIGS. 22-23 require a non-telecentric lens prescription to be recorded into the output grating. In one embodiment of the invention the output grating may encode a microlens array instead of a diffuser. It is noted that LCoS would be positioned sufficiently far from the LCoS to achieve overlap of adjacent microlenses. It should be apparent to those skilled in the art that many other optical design that combine the prescription of diffusers and lenses may be devised that meet the goals of minimizing the overfill of LCoS, matching the microdisplay numerical aperture.

Figure 24A:
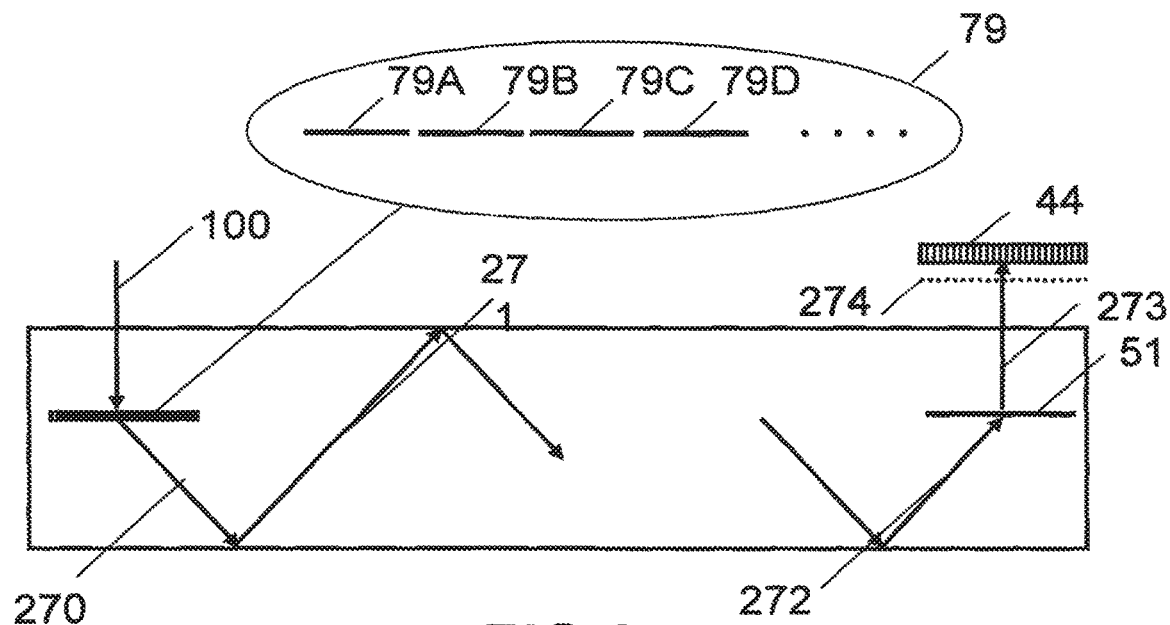
FIG. 24A is a side elevation view of a waveguide despeckler in one embodiment.
Figure 24B:
FIG. 24B is a side elevation view of a microlens array used in some embodiments of the invention.

In one embodiment of the invention there is provided a waveguide despeckler which overcomes subjective speckle. As shown in FIG. 24A the despeckler comprises an input grating comprising a microlens array 79 which comprises independently switchable elements such as the ones indicated by 79A-79D in the inset, and an output grating 51. The equivalent lens array based on refractive elements 79E-79H is shown in FIG. 24B. The microlens array forms a despeckled image at the Fourier plane 274 of the lens array. The ray path from the microlens array to the Fourier plane is indicated by the rays 270-273. The Fourier plane is formed in close proximity to the active surface of the microdisplay 44. The microlens array will typically operate at a relative aperture of F/3.5.

In one embodiment of the invention the laser module comprises a laser source and a beam expander. Advantageously, the beam expander is comprises diffractive optical elements.

The transparent lamina used in the present invention may be implemented using plastic substrates using the materials and processes disclosed in U.S. Provisional Patent Application No. 61/573,066, filed on 24 Aug. 2011 entitled "HOLOGRAPHIC POLYMER DISPERSED LIQUID CRYSTAL MATERIALS AND DEVICES". Advantageously, the SBGs are recorded in a reverse mode HPDLC material in which the diffracting state of SBG occurs when an electric field is applied across the electrodes. An eye tracker based on any of the above-described embodiments may be implemented using reverse mode materials and processes disclosed in U.S. Provisional Patent Application No. 61/573,066, filed on 24 Aug. 2011 entitled "HOLOGRAPHIC POLYMER DISPERSED LIQUID CRYSTAL MATERIALS AND DEVICES". However, the invention does not assume any particular type of SBG. The method of fabricating the SBG pixel elements and the ITO electrodes used in any of the above-described embodiments of the invention may be based on the process disclosed in the PCT Application No. US2006/043938, entitled METHOD AND APPARATUS FOR PROVIDING A TRANSPARENT DISPLAY.

It should be understood by those skilled in the art that while the present invention has been described with reference to exemplary embodiments, it is to be understood that the invention is not limited to the disclosed exemplary embodiments. Various modifications, combinations, sub-combinations and alterations may occur depending on design requirements and other factors insofar as they are within the scope of the appended claims or the equivalents thereof.

What is claimed is:

1. An image projection device comprising:
   a light source;
   a reflective microdisplay;
   a waveguide comprising:
   an input coupler for coupling light from said light source into a total internal reflection (TIR) path in said waveguide;
   an output coupler for coupling light from said TIR path out of said waveguide and towards said reflective microdisplay, wherein said output coupler is configured to transmit light reflected from said reflective microdisplay; and
   a lens for projecting image modulated light reflected from said microdisplay over a field of view; and
   a grating device for applying a variation of at least one of beam deflection or phase retardation across wavefronts of said light coupled into the TIR path, wherein said waveguide is formed from transparent lamina sandwiching said input coupler, said output coupler, and said grating device.

2. The image projection device of claim 1, wherein said light source is configured to emit light in at least first and second wavelength bands; and wherein said input and output couplers are configured to diffract light in said first and second wavelength bands.

3. The image projection device of claim 1, wherein said output coupler has at least one characteristic for providing uniform illumination onto said microdisplay selected from the group of optical power, diffusion, spatially varying light cone tilt, spatially varying light cone angle and spatially varying refractive index modulation.

4. The image projection device of claim 1, further comprising transparent electrodes applied to said transparent lamina.

5. The image projection device of claim 1, wherein said grating device has an optical prescription that varies along said waveguide.

6. The image projection device of claim 1, wherein said grating device comprises more than one grating lamina adjacently disposed along said waveguide.

7. The image projection device of claim 1, wherein said grating device comprises a two-dimensional array of switchable grating elements, wherein electrodes are applied to overlapping portions of the transparent lamina sandwiching said switchable grating elements, at least one of said electrodes being pixelated into elements substantially overlapping said switchable grating elements.

8. The image projection device of claim 1, wherein said grating device is disposed along the TIR path between said input and output couplers.

9. The illumination device of claim 1, wherein said grating device diffuses light into the direction of said TIR path.

10. The image projection device of claim 1, further comprising a second grating device for applying variation of at least one of beam deflection or phase retardation across the wavefronts of said light couple into the TIR path, wherein said grating devices overlap, have identical prescriptions, and are reciprocally configured.

11. The image projection device of claim 1, wherein said grating device is configured as a Hadamard array.

12. The image projection device of claim 1, wherein said grating device provides a laser despeckler.

13. The image projection device of claim 1, wherein light source comprises at least one laser emitter providing at least one wavelength.

14. The image projection device of claim 1, wherein at least one of said transparent lamina is fabricated from plastic.

15. The image projection device of claim 1, wherein said input coupler is a prism.

16. The image projection device of claim 1, wherein said waveguide supports at least one selected from the group of a randomly scattering surface structure, a mirror, a reflection grating, a transmission grating, a blazed surface relief grating, a polarization rotation layer and a reflector overlapping said grating device.

17. The image projection device of claim 1, wherein said waveguide is terminated at an end thereof by at least one selected from the group of a reflector and a quarter wavelength retarder.

18. An image projection device comprising:
    a light source;
    a reflective microdisplay; and
    a waveguide comprising:
    an input coupler for coupling light from said light source into a total internal reflection (TIR) path in said waveguide;
    an output coupler for coupling light from said TIR path out of said waveguide and towards said reflective microdisplay, wherein said output coupler is configured to transmit light reflected from said reflective microdisplay; and
    a lens for projecting image modulated light reflected from said microdisplay over a field of view,
    wherein said output coupler incorporates an optical prescription of at least one selected from the group of a microlens and a diffuser.

* * * * *